(12) United States Patent
Lundberg et al.

(10) Patent No.: US 11,132,412 B1
(45) Date of Patent: Sep. 28, 2021

(54) USER INTERFACE FOR PROVIDING DOCKETING DATA

(71) Applicant: Black Hills IP Holdings, LLC, Minneapolis, MN (US)

(72) Inventors: Steven W. Lundberg, Edina, MN (US); Thomas G. Marlow, Cape Elizabeth, ME (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 0 days.

(21) Appl. No.: 16/836,178

(22) Filed: Mar. 31, 2020

(51) Int. Cl.
*G06F 16/93* (2019.01)
*G06F 16/953* (2019.01)
*G06Q 50/26* (2012.01)
*G06F 3/0482* (2013.01)

(52) U.S. Cl.
CPC .......... *G06F 16/953* (2019.01); *G06F 3/0482* (2013.01); *G06F 16/93* (2019.01); *G06Q 50/26* (2013.01)

(58) Field of Classification Search
CPC ...................................................... G06F 16/93
USPC ........................................................ 707/706
See application file for complete search history.

(56) References Cited

U.S. PATENT DOCUMENTS

| | | | | |
|---|---|---|---|---|
| 5,066,943 A * | 11/1991 | Demirel | ................. | G08B 21/02 340/573.4 |
| 8,078,545 B1 * | 12/2011 | Zilka | .................... | G06Q 50/184 705/310 |
| 8,117,192 B1 * | 2/2012 | Pogodin | ............ | G06F 16/24578 707/722 |
| 8,706,241 B2 * | 4/2014 | Firlik | ..................... | G16H 20/70 607/48 |
| 10,157,352 B1 * | 12/2018 | Chan | ................... | G06F 16/2465 |
| 10,503,801 B1 * | 12/2019 | Tillman | .............. | H04L 63/0823 |
| 10,909,188 B2 | 2/2021 | Lundberg et al. | | |
| 2002/0002481 A1 * | 1/2002 | Uchio | .................... | G06Q 10/10 705/310 |
| 2002/0019836 A1 * | 2/2002 | Uchio | .................... | G06Q 10/10 715/255 |
| 2002/0059076 A1 * | 5/2002 | Grainger | .............. | G06Q 10/109 705/50 |
| 2002/0091542 A1 * | 7/2002 | Grainger | .............. | G06Q 10/109 705/40 |

(Continued)

OTHER PUBLICATIONS

"U.S. Appl. No. 16/159,393, Non Final Office Action dated Jun. 22, 2020", 8 pgs.

(Continued)

*Primary Examiner* — Reza Nabi
(74) *Attorney, Agent, or Firm* — Schwegman Lundberg & Woessner, P.A.

(57) ABSTRACT

Methods and systems for receiving docketing data are disclosed. The methods and systems perform operations comprising: obtaining, by a first party, a patent file wrapper from a publicly accessible database of patent records, the patent-file wrapper including a plurality of patent documents; receiving, from the first party, user input that tags a patent document of the plurality of patent documents in the patent file wrapper, wherein the patent document that is tagged is associated with a patent activity that occurred within a threshold period of time: and transmitting, to a second party by the first party, a communication that includes the tagged patent document.

19 Claims, 10 Drawing Sheets

(56) References Cited

U.S. PATENT DOCUMENTS

| | | | |
|---|---|---|---|
| 2002/0093528 A1* | 7/2002 | Grainger | G06Q 10/10 715/738 |
| 2002/0111824 A1* | 8/2002 | Grainger | G06Q 50/184 705/301 |
| 2002/0111953 A1* | 8/2002 | Snyder | G06Q 10/109 |
| 2002/0161733 A1* | 10/2002 | Grainger | G06Q 10/109 706/45 |
| 2002/0184254 A1* | 12/2002 | Williams | G06F 40/103 715/255 |
| 2003/0220897 A1* | 11/2003 | Lee | G06F 16/24528 |
| 2004/0044688 A1* | 3/2004 | Brudz | G06Q 10/10 |
| 2004/0122840 A1* | 6/2004 | Basichas | G06Q 10/10 |
| 2004/0199400 A1* | 10/2004 | Lundberg | G06Q 50/18 705/310 |
| 2004/0220596 A1* | 11/2004 | Frazier | A61B 17/0057 606/153 |
| 2005/0210009 A1* | 9/2005 | Tran | G06Q 10/10 |
| 2007/0136321 A1* | 6/2007 | Allen | G06Q 50/184 |
| 2007/0219855 A1* | 9/2007 | Van Luchene | G06Q 10/087 705/14.43 |
| 2007/0250364 A1* | 10/2007 | Lundberg | G06Q 10/10 709/219 |
| 2007/0288256 A1* | 12/2007 | Speier | G06F 16/93 715/208 |
| 2008/0288489 A1* | 11/2008 | Kim | G06F 16/334 |
| 2008/0313001 A1* | 12/2008 | Marko | G06Q 50/18 705/7.29 |
| 2009/0012827 A1* | 1/2009 | Avrunin | G06Q 30/0201 705/7.29 |
| 2009/0307004 A1* | 12/2009 | Quinn, Jr. | G06Q 50/184 705/310 |
| 2009/0307577 A1* | 12/2009 | Lee | G06Q 10/10 715/226 |
| 2010/0179817 A1* | 7/2010 | Wold | G06Q 10/10 705/1.1 |
| 2010/0180223 A1* | 7/2010 | Speier | G06F 16/34 715/771 |
| 2011/0093449 A1* | 4/2011 | Belenzon | G06N 7/005 707/708 |
| 2011/0179022 A1* | 7/2011 | Chen | G06F 16/40 707/723 |
| 2011/0213830 A1* | 9/2011 | Lopez | G06Q 10/06 709/203 |
| 2012/0183196 A1* | 7/2012 | Dasgupta | G06T 1/20 382/132 |
| 2012/0191508 A1* | 7/2012 | Gross | G06Q 50/184 705/7.36 |
| 2012/0226684 A1* | 9/2012 | Holt | G06Q 10/10 707/726 |
| 2012/0323625 A1* | 12/2012 | Lee | G06Q 10/10 705/7.17 |
| 2012/0330874 A1* | 12/2012 | Jerram | G10L 25/48 706/46 |
| 2013/0084009 A1* | 4/2013 | Lundberg | G06F 16/9535 382/182 |
| 2013/0085911 A1* | 4/2013 | Lundberg | G06F 16/248 705/30 |
| 2013/0086043 A1* | 4/2013 | Lundberg | G06F 16/338 707/722 |
| 2013/0117300 A1* | 5/2013 | Talwar | G06F 16/245 707/769 |
| 2013/0132302 A1* | 5/2013 | Lundberg | G06Q 40/06 705/36 R |
| 2013/0282409 A1* | 10/2013 | Lundberg | G06Q 40/06 705/4 |
| 2013/0282599 A1* | 10/2013 | Kang | G06Q 10/10 705/310 |
| 2013/0282735 A1* | 10/2013 | Pedersen | G06Q 50/184 707/748 |
| 2014/0052650 A1* | 2/2014 | Lundberg | G06Q 40/06 705/310 |
| 2014/0258153 A1* | 9/2014 | Lundberg | G06Q 10/10 705/310 |
| 2014/0317000 A1* | 10/2014 | Lundberg | G06Q 50/184 705/310 |
| 2014/0317125 A1* | 10/2014 | Lundberg | G06F 16/35 707/748 |
| 2014/0365386 A1* | 12/2014 | Carstens | G06Q 50/184 705/310 |
| 2015/0199779 A1* | 7/2015 | Lundberg | G06Q 10/00 705/310 |
| 2016/0048936 A1* | 2/2016 | Perkowski | G06Q 50/184 705/310 |
| 2016/0203573 A1* | 7/2016 | Huang | G06Q 50/184 705/310 |
| 2017/0097747 A1* | 4/2017 | Allen | G06F 40/174 |
| 2017/0098290 A1* | 4/2017 | Allen | G06F 3/0482 |
| 2018/0293678 A1* | 10/2018 | Shanahan | G06N 3/088 |
| 2018/0330456 A1* | 11/2018 | Odutola | G06Q 40/06 |
| 2019/0057074 A1* | 2/2019 | Carey | G06F 16/93 |
| 2019/0220938 A1* | 7/2019 | Sukman | G06Q 50/184 |
| 2020/0117718 A1 | 4/2020 | Lundberg et al. | |
| 2020/0117753 A1* | 4/2020 | Lundberg | G06Q 10/06 |
| 2020/0250776 A1* | 8/2020 | Spangenberg | G06Q 50/184 |
| 2020/0250779 A1* | 8/2020 | Spangenberg | G06F 16/27 |
| 2020/0272692 A1* | 8/2020 | Maan | G06F 16/345 |
| 2020/0387974 A1* | 12/2020 | Spangenberg | G06Q 40/08 |
| 2020/0387975 A1* | 12/2020 | Spangenberg | G06Q 40/08 |
| 2021/0082070 A1* | 3/2021 | Shanahan | G06N 20/00 |
| 2021/0117433 A1* | 4/2021 | Lundberg | G06F 16/248 |

OTHER PUBLICATIONS

"U.S. Appl. No. 16/159,393, Response filed Sep. 22, 2020 to Non Final Office Action dated Jun. 22, 2020", 9 pgs.

"U.S. Appl. No. 16/159,393, Notice of Allowance dated Oct. 2, 2020", 5 pgs.

"U.S. Appl. No. 16/159,393, Notice of Allowance dated Oct. 6, 2020", 4 pgs.

* cited by examiner

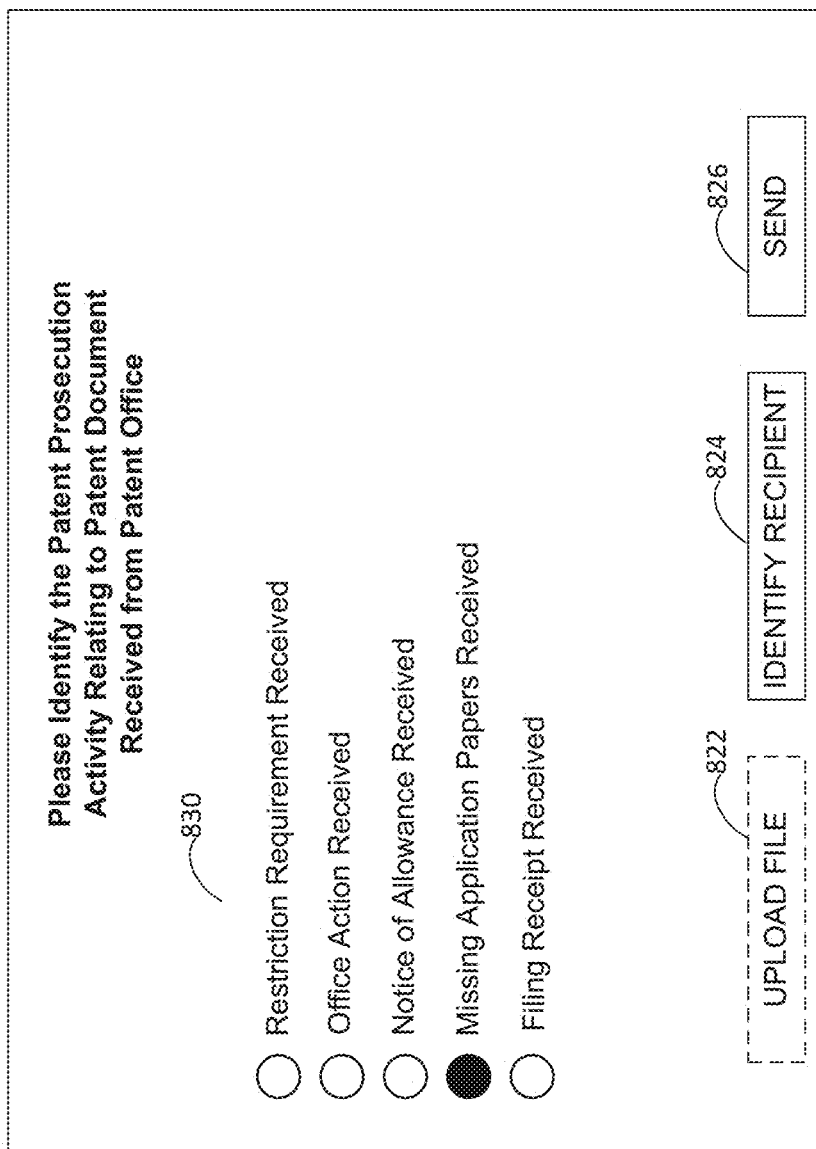

USER INTERFACE FOR PROVIDING DOCKETING DATA

BACKGROUND

The management of patent portfolios involves multiple stages of the patent lifecycle. Initially, a decision is made as to what inventions are worth the investment of filing a patent application. Then, each filed patent application goes through prosecution with the patent office. Finally, for each patent that is allowed, maintenance fees must be paid at a variety of intervals to keep the patent in force. Patent management tools are used by companies and law firms for active patent matters (e.g., unfiled, pending and issued patent matters) as well as inactive patent matters (e.g., expired, abandoned or closed patent matters) to enable users to efficiently manage patent matters throughout the patent lifecycle.

Many patent management tools include patent docketing capabilities for tracking important due dates for PTO related deadlines and providing a document repository for PTO related correspondences and documents. The patent docketing process may involve (1) storing all key intellectual property information in a centralized and consolidated database; (2) providing access to critical information from documents (e.g., correspondences between law firms and the U.S. PTO, or law firms and clients) and deadlines (e.g., PTO deadlines and non-PTO deadlines); and (3) providing customizable workflows for streaming and automating the patent management processes throughout the patent lifecycle.

BRIEF DESCRIPTION OF DRAWINGS

Some embodiments are illustrated by way of example and not limitation in the figures of the accompanying drawings in which:

FIGS. 4-7, 8A and 8B are depictions of user interfaces, according to an example embodiment.

DETAILED DESCRIPTION

Figure 1:
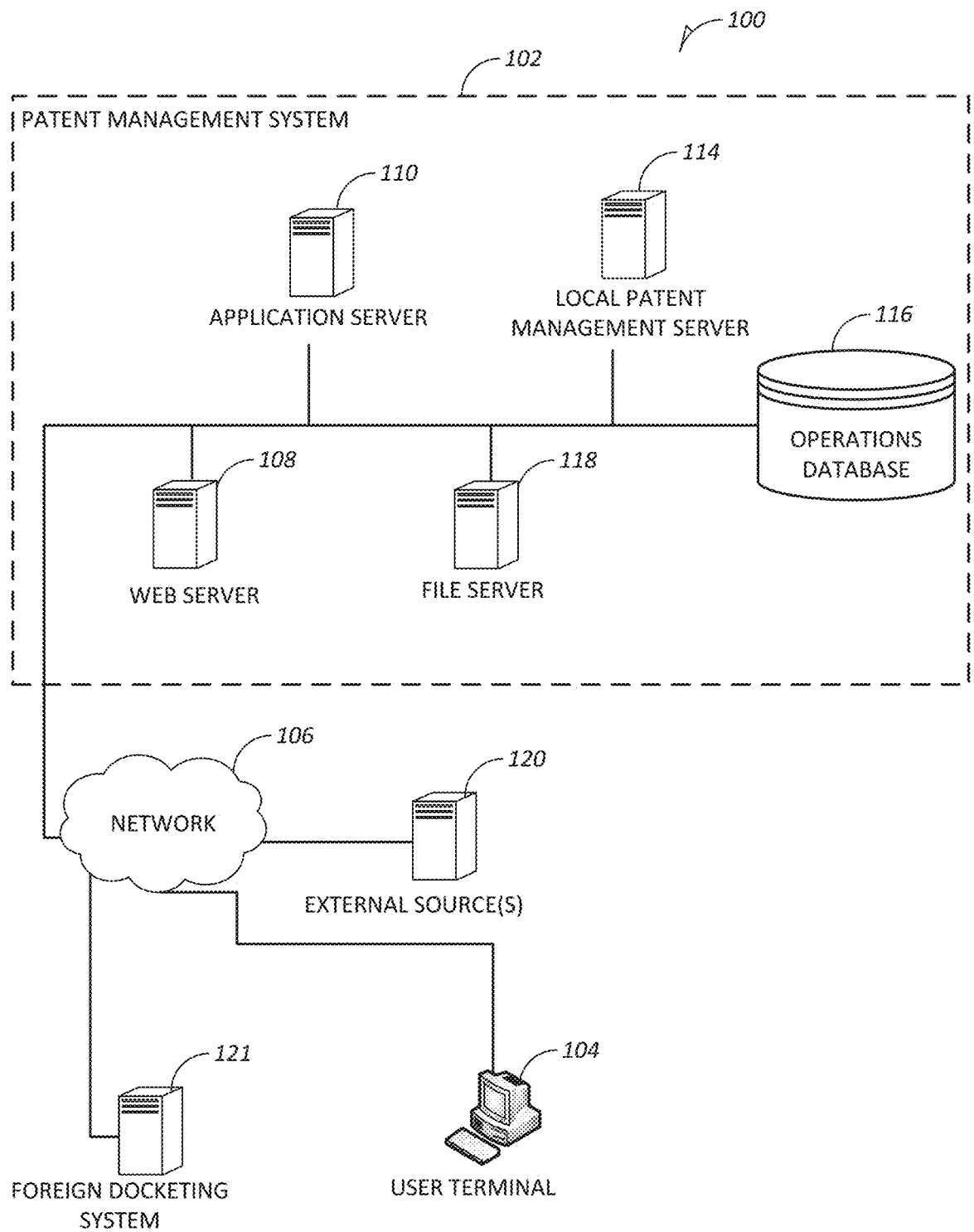
FIG. 1 is a system component diagram, according to an example embodiment.

Typically, patent documents flowing back and forth between parties (e.g., a patent agent or law firm in one country and another patent agent or law firm in another country) have no predefined structure. Specifically, a first party, in a first jurisdiction or a first country, receives or submits a patent document relating to a particular patent prosecution activity to a patent office in the first jurisdiction or the first country. Then the first party notifies the second party, who is in a second jurisdiction or second country, about the particular patent prosecution activity in any number of ways (e.g., by email, by phone call, by providing access to the documents) none of which has a predefined structured. Namely, the first party may use various mechanisms and language or customized text to describe the particular patent prosecution activity. Even still, a third party in a third jurisdiction or a third country may use other text to describe the particular patent prosecution activity when such an activity is performed in the third jurisdiction or third country.

This lack of predefined structure in the way in which information is communicated places a great burden on the second party who is receiving these notifications to discern what the particular patent prosecution activity is in order to properly categorize and input the particular patent prosecution activity into the patent database maintained by the second party. Further, such lack of structure in the way in which patent prosecution activities are reported and communicated across different parties in different jurisdictions increases the risk of introducing errors into the docketing information that is being maintained by a receiving party.

Techniques set forth in this specification provide a user interface that simplifies the way in which patent prosecution activities are reported and communicated between different parties across different jurisdictions. The user interface allows parties to report patent prosecution activities in a structured manner by selecting the type of prosecution activities being reported from a predetermined list of activities. This reduces the number of screens and interfaces required to report such prosecution activities and increases the efficiencies of systems that maintain docketing information. Specifically, by introducing structure and consistency to the way in which patent prosecution activities are reported and communicated across parties in different jurisdictions, such patent prosecution activities and documents related thereto can be automatically inputted, coded and categorized in the receiving party's patent databases. Also, by ensuring that such data is properly categorized and entered into the docketing system, and is accurate and error free, the reliability and accuracy of the docketing system is improved.

The systems and methods set forth in this specification are described in relation to a patent management system (such as a patent docketing system) and patent matters, but it will be understood that the present inventive subject matter could equally be applied to other forms of intellectual property (trademarks, copyright, registered designs, and the like). Moreover, the term "patent" is not intended to be limited to an issued patent, but may include a pending patent application or unfiled application or invention disclosure. The term "user" is intended to cover any person interacting with the patent management system, A user may be an inventor, portfolio manager, business manager, patent attorney, patent paralegal, or patent docketing personnel, for example.

FIG. 1 is a schematic view of a computer network system 100 according to various embodiments. The computer network system 100 includes patent management system 102 and user terminal 104 communicatively coupled via network 106. In an embodiment, patent management system 102 includes web server 108, application server 110, and a local patent management server 114 which may be used to manage at least operations database 116 and file server 118. Patent management system 102 may be implemented as a distributed system, for example one or more elements of the patent management system 102 may be located across a wide-area network (WAN) from other elements of patent management system 102. As another example, a server (e.g., web server 108, file server 118, local patent management server 114) may represent, a group of two or more servers, cooperating with each other, provided by way of a pooled, distributed, or redundant computing model.

Local patent management server 114 may be configured to receive various patent prosecution activities and associate such activities with corresponding patent matters. Local patent management server 114 may include a set of docket items or reminders for every patent matter that is stored. Local patent management server 114 may be configured to access a publicly available patent database, such as a patent application information retrieval (PAIR) system local to the jurisdiction in which the local patent management server 114 is maintained. For example, local patent management server 114 may be in a first country (e.g., the USA) and may access the PAIR system that is local to the first country. Local patent management server 114 may access applications in the local PAIR system using application numbers and/or other patent application identifiers of the matters which are stored in the local patent management server 114. Local patent management server 114 downloads and updates the locally stored patent prosecution activities for every matter that is accessed from the PAIR system.

In an embodiment, the local patent management server 114 downloads the entire file wrapper that is stored in the PAIR system and stores the downloaded file wrapper in association with the corresponding matter stored in the local patent management server 114. The file wrapper stored in the PAIR system includes a list of patent prosecution activities (e.g., documents submitted to the PAIR system by a given party for a given patent application and documents issued by the PAIR system in association with the given patent application). The file wrapper may be chronologically ordered according to when the given prosecution activities took place. In an embodiment, the local patent management server 114 only downloads any changes that are detected between the patent matter stored in local patent management server 114 and the corresponding application stored in the PAIR system. In some embodiments, the download and/or update is performed automatically periodically for all matters stored in the local patent management server 114 or for a subset of selected matters. In some embodiments, the download and/or update is performed in response to a specific user request (e.g., a selection of a refresh option) for all matters stored in the local patent management server 114 or for a subset of selected matters.

Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LAN's or WAN's, such as the Internet. The various devices/systems coupled to network 106 may be coupled to network 106 via one or more wired or wireless connections.

Web server 108 may communicate with file server 118 to publish or serve files stored on file server 118. Web server 108 may also communicate or interface with the application server 110 to enable web-based applications and presentation of information. For example, application server 110 may consist of scripts, applications, or library files that provide primary or auxiliary functionality to web server 108 (e.g., multimedia, file transfer, or dynamic interface functions). Applications may include code, which when executed by one or more processors, ran the software components of patent management system 102. In addition, application server 110 may also provide some or the entire interface for web server 108 to communicate with one or more of the other servers in patent management system 102 (e.g., local patent management server 114).

Web server 108, either alone or in conjunction with one or more other computers in patent management system 102, may provide a user-interface to user terminal 104 for interacting with the tools of patent management system 102 stored in application server 110. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

User terminal 104 may be a personal computer or mobile device. Although only one user terminal 104 is shown in FIG. 1, any number of additional user terminals 104 may be presented. In an embodiment, one user terminal 104 may be located in a first jurisdiction and/or a first country and be accessible or operated by a first party. A second user terminal 104 may be located in a second jurisdiction and/or a second country and be accessible or operated by a second party. Each user terminal 104 accesses the PAIR system local to the jurisdiction of the user terminal 104 and accesses the local patent management server 114 in its jurisdiction. Specifically, a separate local patent management server 114 may be included in each jurisdiction in which a user terminal 104 exists. The local patent management server 114 stores the PAIR system information for the matters in its own jurisdiction or country.

In an embodiment, user terminal 104 includes a client program to interface with patent management system 102. The client program may include commercial software, custom software, open source software, freeware, shareware, or other types of software packages. In an embodiment, the client program includes a thin client designed to provide query and data manipulation tools for a user of user terminal 104. The client program may interact with a server program hosted by, for example, application server 110. Additionally, the client program may interface with local patent management server 114. In an embodiment, the user terminal 104 accesses or provides information about PAIR system information local to its jurisdiction or country to a second local patent management server 114 in another jurisdiction. This may take place by the user terminal 104 accessing a website that interfaces and provides information to the second local patent management server 114. Alternatively, the user terminal 104 includes a specific program that allows a user of the user terminal 104 in one jurisdiction to transmit information about patent matters to the second local patent management server 114 in another jurisdiction or country.

For example, a first user terminal 104 in a first jurisdiction may be used by a first party to access a PAIR system (e.g., a publicly available database of patent matters) in the first jurisdiction. The access to the PAIR system may be performed by directly accessing the website or portal of the PAIR system and/or by accessing matters stored in the local patent management server 114 in the first jurisdiction which have been updated based on information in the PAIR system. The first user terminal 104 presents a file wrapper or list of prosecution activities associated with a given matter. For example, the first user terminal 104 may present a graphical user interface that lists all or a subset of prosecution activities (e.g., application filing, response to office action filing, response to restriction requirement filing, issue fee payment, appeal brief filing, petition filing, restriction requirement received, office action received, notice of allowance received, missing application papers received, filing receipt received, etc.). These activities may include actions performed by the first party to upload, transmit or file a document in a given patent application with the PAIR system in the first jurisdiction. These activities may include communications issued by the PAIR system in the first jurisdiction in connection with the given patent application. In an embodiment, the list of activities are sorted chronologically according to when they were performed.

Once the file wrapper is presented in the graphical user interface of the first user terminal 104, the first party may selectively choose certain prosecution activities that are listed to report or notify a second party in a second jurisdiction or country. For example, the first party may select an application filing activity that is listed in the file wrapper. In response to receiving the selection, the first user terminal 104 presents (in an overlay on top of the file wrapper or in a separate navigation screen) a list of options associated with the selected activity. In some embodiments, the list of options may be dynamically presented based on whether the selected activity is a prosecution activity performed by the first party in transmitting a document to the PAIR system in the first jurisdiction or is a prosecution activity that was performed based on a communication being issued by the PAIR system. In some embodiments, the list of options includes a miscellaneous option.

In some embodiment, one of the listed options is highlighted by default based on a best guess estimate computed by the first user terminal 104 (or server associated with the first user terminal 104) about the contents of the selected prosecution activity. In an embodiment, if a title of the selected prosecution activity is substantially similar (e.g., has more than 50% of the words match) to one of the listed options, that option is highlighted by default. In response to receiving a user selection from the first party of one of the options and/or in response to the first party selecting a send option, the first user terminal 104 retrieves the document corresponding to the selected prosecution activity (e.g., directly from the PAIR system and/or from the local patent management server 114 in the first jurisdiction). The first user terminal 104 obtains contact information for a second party in a second jurisdiction or country and generates a communication to notify the second party about the selected prosecution activity. The first user terminal 104 may populate a template with the metadata corresponding to the selected option from the list of options, a patent application number of the file wrapper, other bibliographical information about the patent application, a title of the prosecution activity, due dates associated with the prosecution activity, and the retrieved document. The first user terminal 104 transmits the populated template to the local patent management server 114 of the second party.

In some embodiments, a selected option may be further associated with additional options. For example, a selected option may be associated with one or more due dates. In such cases, a set of additional options that allow the user to input one or more due dates associated with the selected option for the selected prosecution activity are presented. Once the user selects and/or inputs information for these additional options, the first user terminal 104 populates a template with the initial set of options and the additional selected options and transmits the populated template to the local patent management server 114 of the second party.

The local patent management server 114 in the second jurisdiction of the second party parses the template automatically and automatically updates information for the matter associated with the bibliographical and/or patent-application number received in the template based on the selected prosecution activity and retrieved document. For example, the selected prosecution activity is a new patent application filing. In response, the local patent management server 114 adds a new record or updates an existing record that matches the bibliographical information of the new patent application filing with the documents received in the template and/or other information that was missing from the local patent management server 114 that is now included in the template, such as the patent application number.

In some embodiments, the first user terminal 104 in a first jurisdiction or first country accesses a website associated with the second jurisdiction or second country of the local patent management server 114. Via the website, the first party may upload a given file (e.g., a document submitted to the PAIR system and/or received from the PAIR system). In response to uploading the document, the website presents the list of options for a user to select to identify the prosecution activity representing the uploaded file. Once the option is selected, a template is populated and used to update a matter stored by the local patent management server 114 in the second jurisdiction.

Operations database 116 may be composed of one or more logical or physical databases. For example, operations database 116 may be viewed as a system of databases that when viewed as a compilation, represent an "operations database." Sub-databases in such a configuration may include a matter database, a portfolio database, a user database, a mapping database, and an analytics database. Operations database 116 may be implemented as a relational database, a centralized database, a distributed database, an object-oriented database, or a flat database in various embodiments.

In various embodiments, the patent management system framework may have a base organization unit of a matter. In various embodiments, a matter is an issued patent or patent application that includes one or more patent claims. In an embodiment, a matter is generally identified by its patent number or publication number. Identification may mean either identification as it relates to a user of the patent management system or within the patent management system. Thus, a user may see a matter listed as its patent number while internally a database of the patent management system may identify it by a random number.

One or more matters may be grouped together to form a portfolio. A matter may also be associated with one or more other matters in a family. A family member may be a priority matter, a continuing (e.g., continuation, divisional) matter, or foreign counter-part member. Family members may be determined according to a legal status database such as INPADOC.

Data stored in a first database may be associated with data in a second database through the use of common data fields. For example, consider entries in the matter database formatted as [Matter ID, Patent Number] and entries in the portfolio database formatted as [Portfolio ID, Matter ID], In this manner, a portfolio entry in the portfolio database is associated with a matter in the matter database through the Matter ID data field. In various embodiments, a matter may be associated with more than one portfolio by creating multiple entries in the portfolio database, one for each portfolio that the matter is associated with. In other embodiments, one or more patent reference documents may be associated with a patent by creating multiple entries in the patent database, for example. The structure of the database and format and data field titles are for illustration purposes; other structures, names, or formats may be used. Additionally, further associations between data stored in the databases may be created as discussed further herein. As referred to herein, docketing information includes bibliographic information, docketing activity information, deadline information, or documents associated with a given matter or portfolio or any other information stored in the patent management system databases.

During operation of patent management system 102, data from multiple data sources (internal and external) may be imported into or accessed by the operations database 116. Internal sources may include data from the various tools of the patent management system 102. External sources 120 may include publicly available databases such as websites or databases associated with foreign and domestic patent offices, assignment databases, WIPO, and INPADOC. In various embodiments, the data is scraped and parsed from the websites. The data may be gathered using API calls to the external sources 120 when available. The data may be imported and stored in the operations database on a scheduled basis, such as daily, weekly, monthly, quarterly, or some other regular or periodic interval. Alternatively, the data may be imported on-demand. The imported data may relate to any information pertaining to patents or patent applications, such as serial numbers, title, cited art, inventor or assignee details and the like.

After data importation, the data may be standardized into a common format. For example, database records from internal or external sources may not be in a compatible format with the operations database. Data conditioning may include data rearrangement, normalization, filtering (e.g., removing duplicates), sorting, binning, or other operations to transform the data into a common format (e.g., using similar date formats and name formats).

Figure 2:
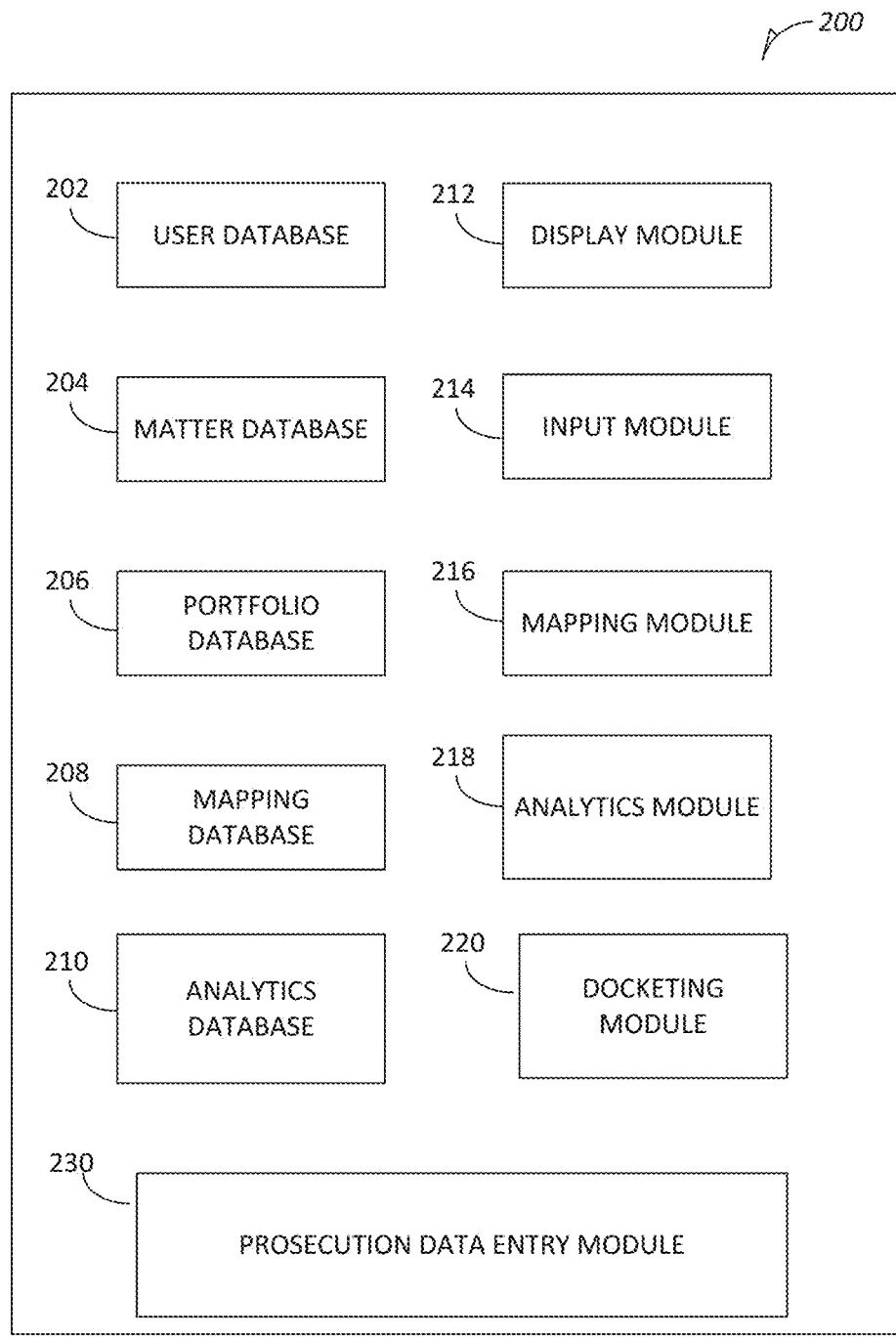
FIG. 2 is a block diagram of a patent management system, according to an example embodiment.

FIG. 2 is a block diagram of patent management system 200 of each jurisdiction or country associated with each different party (e.g., agent or law firm in a given jurisdiction), according to an example embodiment. Illustrated are user database 202, matter database 204, portfolio database 206, mapping database 208, analytics database 210, display module 212, input module 214, mapping module 216, analytics module 218, docketing module 220, and prosecution data entry module 230, The components illustrated in FIG. 2 may be implemented by one or more of the components shown in FIG. 1 for patent management system 102. In various embodiments, the data stored in databases 202, 204, 206, 208, and 210 may be in the same or multiple physical locations. Data stored in any of databases 202, 204, 206, 208 and 210 may be referred to as docketing information. For example, portfolio database 206 may be stored in one or more computers associated with a portfolio management service. In various embodiments, patent management system 102 mirrors databases stored in other locations. In an embodiment, when a request is made to access data stored in the databases, patent management system 102 determines where the data is located and directs the request to the appropriate location. Similarly, modules 212, 214, 216, 218, 220 and 230 may be executed across multiple computer systems.

In an embodiment, matter database 204 stores docketing information representing matters as well as file histories (file wrappers), correspondences, and other documents related to patent matters. Each matter may be associated with one or more portfolios. In some embodiments, a matter is associated with no portfolios. In various embodiments, a matter is a foreign or domestic patent or application. Matters may also be inventions that have not yet been filed. In an embodiment, docketing information in a matter entry includes bibliographic fields representing a matter ID, patent number, publication number, serial number, docketing number, title (e.g., the name of the patent or application), type of the matter (e.g., application, issued patent, PCT application), status of the matter (e.g., issued, abandoned, allowed), a link to the patent office where the matter was filed, a link to a PDF download of the matter, abstract of the matter, inventors of the matter, current-owner of the matter, cited references on the face of the matter, filed date, issue date, docket number, customer or client instructions, and annuity information (e.g., due date, country, and amount due). In an embodiment, docketing information in a matter entry includes activity fields representing a list of prosecution activities from oldest to newest including upcoming due dates and past completed activities. Activities may include disclosure receipt, application filing, office actions received, office action responses filed, allowances received, issue fee payments, patent expiration, maintenance fees, etc.

More or fewer data fields associated with a patent may be included in a matter entry stored in matter database 204. In an example embodiment, matter database 204 may store a patent matter database, wherein this database includes patent matter data and related documents and communications. For an example embodiment, a complete list of docketing activity templates is stored in a table in matter database 204 and/or analytics database 210.

In various embodiments, the data is scraped and parsed from the websites local to the jurisdiction of the patent management system 102 (e.g., a local PAIR system) if it is unavailable through a database. The data may be gathered using API calls to the sources when available. The data may be imported and stored in the operations database on a scheduled basis, such as daily, weekly, monthly, quarterly, or some other regular or periodic interval. Alternatively, the data may be imported on-demand. The imported data may relate to any docketing information pertaining to patents or patent applications, such as serial or application numbers, title, cited art, inventor or assignee details and the like. As the data is gathered, scraped, parsed and imported, the data is checked for errors before or after being imported. In some eases, data in a patent management system 102 of a second jurisdiction or second country is received as a template that is populated by a party in first jurisdiction or first party. For example, the first party may use the prosecution data entry module 230 to selectively choose a particular prosecution activity to report, and select an option from a list of options presented in a graphical user interface to identify the selected prosecution activity. The prosecution data entry module 230 generates a template that includes one or more documents pertaining to the prosecution activity, metadata or information using the selected option to represent the prosecution activity, and/or various bibliographical or docketing information for the prosecution activity. The patent management system 102 in the second country or second jurisdiction receives the template from the first jurisdiction or first country and parses the data in the template to update the corresponding record that is stored and maintained by the patent management system 102 in the second country or second jurisdiction.

In various embodiments, a matter is associated with one or more other matters as a family with a family ID. Family members may be priority documents, continuation patents/applications, divisional patents/applications, and foreign patent/application counterparts. In an embodiment, family information is determined according to an external source such as INPADOC. Patent reference documents and/or other prior art may be manually or automatically stored, cross-cited and associated with related family matters, for example.

Portfolio database 206, in an example embodiment, stores data representing portfolios of one or more matters. Data stored in portfolio database 206 may have been previously generated by the patent management system 102. In various embodiments, a portfolio may be generated by a user using patent management system 102. For example, a user interface may be presented to the user requesting a name for the portfolio and identifiers of matters to be included in the portfolio. In an embodiment a portfolio entry in portfolio database 206 includes the data fields of portfolio ID and portfolio name. Additionally, a data field for matter ID may also be included in an entry in the portfolio database 206. Thus, each portfolio may be associated with one or more matters through the use of the matter ID data field. More or fewer data fields associated with a portfolio may be included in a portfolio entry of portfolio database 206.

For various embodiments, a portfolio may represent all matters associated with a particular law firm, client, technology or other grouping of matters. By grouping portfolios in this manner, the docketing processes for docketing the next most probable docketing activity may be customized or tailored for a particular client or law firm. For example, a law firm managing portfolios of several clients may decide to tailor their docketing process flows for the individual clients based on the client/s internal intellectual property procedures. This may require the law firm to add customized docketing activity templates to track non-PTO activities.

In various embodiments, mapping database 208 may include mappings of patent concepts to one or more matters. For example, the mapping module 216 is configured to facilitate mappings to associate at least one response due date or other date (e.g., date mailed) with the at least one downloaded document.

Figure 4:
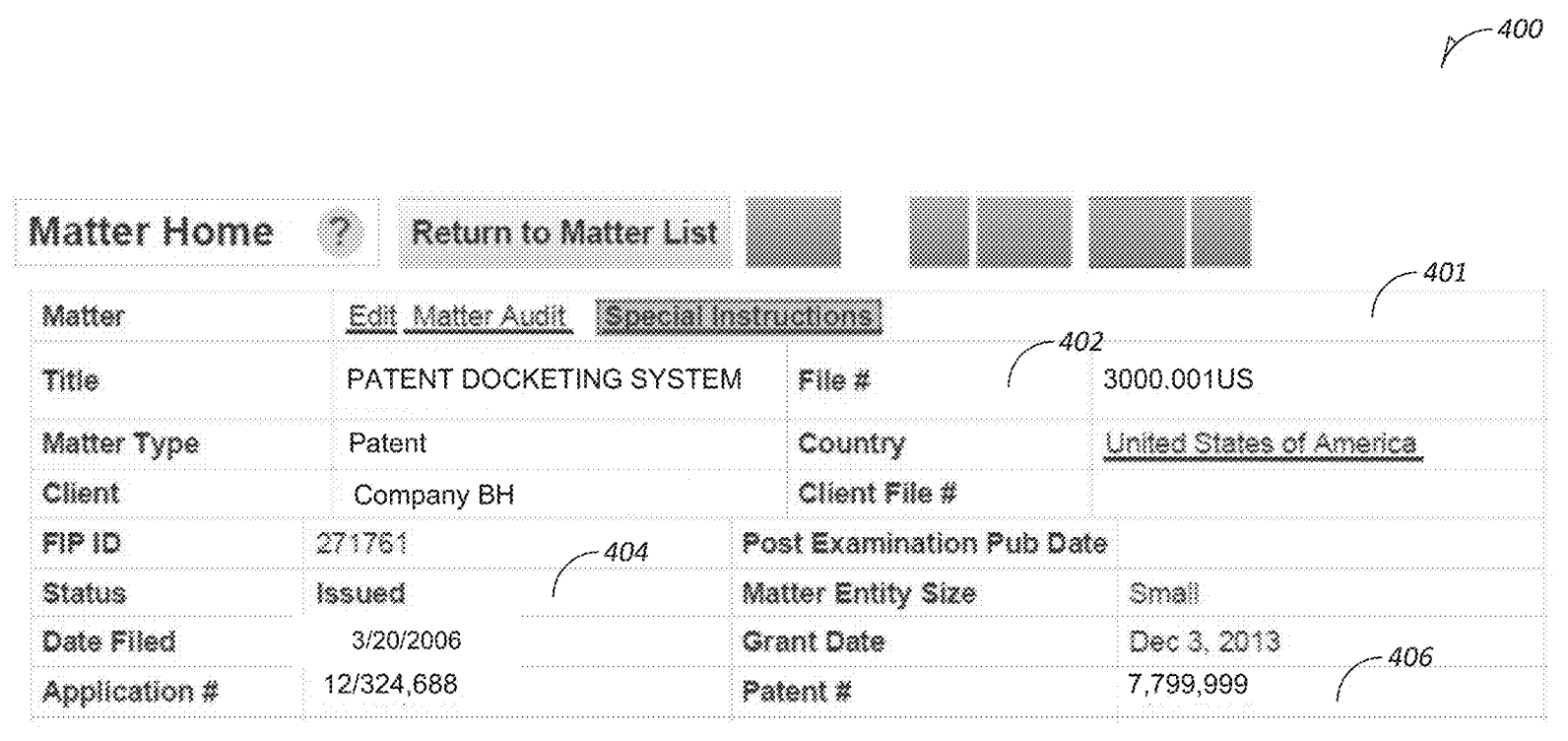
Figure 5:
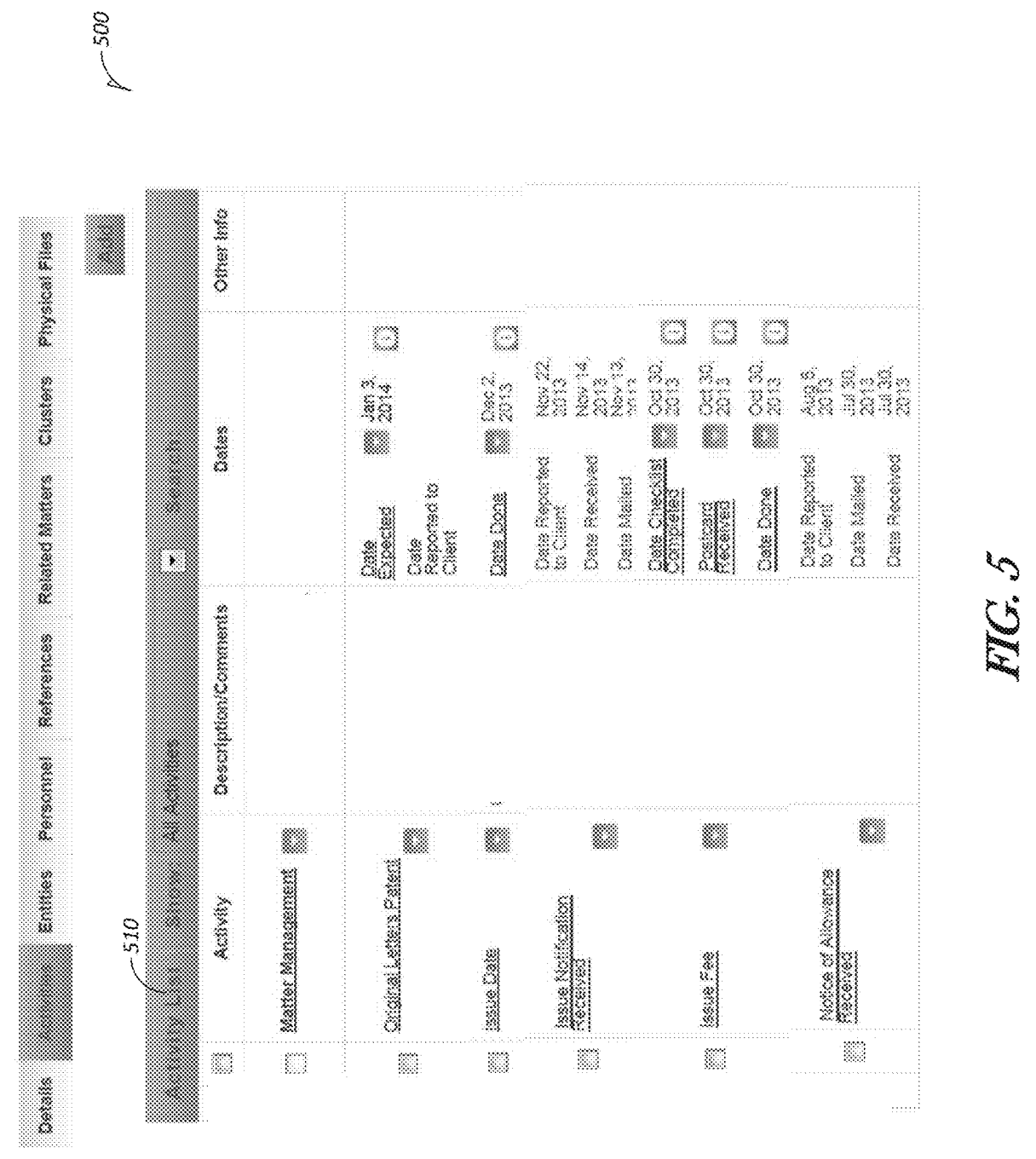

In an embodiment, display module 212 is configured to display user interfaces and information retrieved from one or more databases 202, 204, 206, 208, and 210. If a user is accessing patent management system 102 remotely (e.g., through a web browser), display module 212, representing a user-interface through a network to a user terminal, may be configured to transmit data. In various embodiments, display module 212 may present patent matters bibliographic details, as shown in FIG. 4, and various docketing activities docketed including relevant dates for patent matters, as shown in FIG. 5. Furthermore, docketing data may be entered, through input module 214, into the user interface fields shown in FIGS. 4 and 5.

In various embodiments, input module 214 receives data from multiple sources where it may be further processed by one or more other modules and stored in one or more of databases 202, 204, 206, 208, and 210. In various embodiments, input module 214 of the patent management system 102 may comprise a search engine (not shown) for conducting searches at a patent registry or on the Internet. For example, input module 214 may be configured to utilize one or more APIs to data from one or more patent data stores or publicly available databases (e.g., public PAIR, private PAIR, INPADOC, foreign patent offices, patent docketing systems, portfolio management systems, etc.). The data may include published patent documents, patent applications, office actions or other patent office correspondences, prior art references, dockets dates, annuity payment data and patent or patent application assignment information. Specific assignment data may include details pertaining to the assignor or assignee (e.g., name, address, nationality, place of incorporation), date of assignment, details of the matter being assigned, or any other data pertaining to assignments or change in ownership that may be recorded at any national or regional patent registry such as the United States Patent and Trademark Office (USPTO), World Intellectual Property Organization (WIPO) or European Patent Office (EPO), for example.

In various embodiments, input module 214 is configured to receive input from one or more user interface elements. For example, patent management system 102 may present multiple user interfaces to a user. These user interfaces may enable users to input data directly into databases 202, 204, 206, 208, and 210, instruct the patent management system 102 to retrieve data from patent data stores, and instruct the patent management system 102 to perform various operations (e.g., analysis) on the data in databases 202-210.

Additionally, input module 214 may be configured to determine the selection of one or more user interface elements by a user and initiate the action associated with the selected user interface element. In other example embodiments, input module 214 may be configured to receive user input to select patent matters and patent activity templates for docketing, and then provide the necessary information to update the patent activity templates to generate the docket due dates or other due dates to implement the user's patent management workflows.

In various embodiments, input module 214 processes the data that has been inputted and formats it according to the data fields of databases 202, 204, 206, 208, and 210 as discussed above. In various embodiments processing is completed using a parsing module (not shown). For example, consider a patent publication that a user has directed to be inputted into one or more of the databases. The parsing module may use a combination of automatic image recognition and text analysis to determine the filing date, issue date, title, abstract, and claims of the patent.

The resulting data that has been parsed by the parsing module may then be entered as an entry in one or more of databases 202, 204, 206, 208, and 210 and/or communicated in a template to a patent management system 102 in another jurisdiction or country. This may be accomplished by, for example, formulating an insert SQL query with the parsed information. In various embodiments the parsing module may parse multiple pieces of information before generating a database entry. For example, input module 214 may receive a docket number for an issued patent. The docket number may be combined with the information parsed from the issued patent to form an entry in matter database 204.

In various embodiments, the docketing module 220 is configured to provide template-based docketing of activities for patent matters with country-law-based due date calculations and customizable workflow's to automate docketing activities as needed. The docketing module 220 includes docketing activity templates for the various PTO activities and other templates for non-PTO activities for managing PTO and non-PTO due dates and activities, both of which can be pre-defined by the system or customized by users to implement the desired patent docketing workflow's. Examples of non-PTO templates and docketing activities include the tracking of due dates for managing internal tasks within a law firm or corporate patent department, or tracking correspondences to-and-from foreign associates who are the registered agents for the patent matters in their respective PTO.

Several key decisions such as filing international applications or filing divisionals/continuations/CIPs, and annuity payment review can be triggered directly from the docketing module 220. The docketing module 220 calculates the deadlines based on filing, prosecution, and grant dates for each patent matter or other prosecution dates (e.g., date mailed, date received, etc.), jurisdiction and applicable laws, and type of filing. Furthermore, the docketing module 220 is updated with the applicable country laws for all major countries as needed. Additionally, the docketing module 220, together with display module 212 and input module 214, provides an interface for users to appropriately input docketing data required (including the selection of the next most probable docketing activity) for docketing and due date generation into the relevant fields.

Tracking statutory deadlines and storing PTO correspondences is critical for managing patent portfolios effectively. Several PTO offices provide electronic data access for filing, prosecution, and maintenance-related activities, which can be accessed by the docketing module 220 via input module 214, which may have an electronic interface, such as an API, for fully or partially automating the downloading of documents and correspondences from the PTOs and/or uploading and docketing in the user's patent management or docketing system. The PTO correspondences are stored in matter database 204 and can be retrieved through the input module 214 by the user.

Patent docketing systems may be maintained or updated automatically, as described above, or by patent docketing specialists who perform docketing and upload documents and correspondences into the patent management system 102 as PTO correspondences are received. Furthermore, the patent management system 102 needs to be updated with information and docketing activities as patent attorneys, agents or paralegals complete patent activities, such as filing various responses with the PTO in their corresponding jurisdiction or country. The patent docketing process requires trained patent docketing specialists, who understand the patent lifecycle and PTO rules and regulations to properly docket patent matters as responses or other documents are filed with the PTO, or received from the PTO, to docket PTO activities. Other non-PTO activities may also be important to docket, for example, law firms docket their internal processes for implementing their client requested procedures or correspondences with foreign associates who communicate and file responses directly with their respective foreign patent offices.

Prosecution data entry module 230 presents a file wrapper or list of prosecution activities associated with a given matter to a first party in a first jurisdiction or first country. For example, the prosecution data entry module 230 may present a graphical user interface that lists all or a subset of prosecution activities (e.g., application filing, response to office action filing, response to restriction requirement filing, issue fee payment, appeal brief filing, petition filing, restriction requirement received, office action received, notice of allowance received, missing application papers received, filing receipt received, etc.). These activities may include actions performed by the first party to upload, transmit or file a document in a given patent application with the PAIR system in the first jurisdiction. These activities may include communications issued by the PAIR system in the first jurisdiction in connection with the given patent application. In an embodiment, the list of activities are sorted chronologically according to when they were performed.

Once the prosecution data entry module 230 presents the file wrapper in the graphical user interface to the first party, the prosecution data entry module 230 may receive a user input from the first party selecting certain prosecution activities that are listed to report or notify a second party in a second jurisdiction or country. For example, the first party may select an application filing activity that is listed in the file wrapper. In response to receiving the selection, the prosecution data entry module 230 presents (in an overlay on top of the file wrapper or in a separate navigation screen) a list of options associated with the selected activity. In some embodiments, the list of options may be dynamically presented based on whether the selected activity is a prosecution activity performed by the first party in transmitting a document to the PAIR system in the first jurisdiction or is a prosecution activity that was performed based on a communication being issued by the PAIR system. In some embodiments, the list of options includes a miscellaneous option.

In some embodiment, one of the listed options is highlighted by default based on a best guess estimate computed by the prosecution data entry module 230 about the contents of the selected prosecution activity. In an embodiment, if a title of the selected prosecution activity is substantially similar (e.g., has more than 50% of the words match) to one of the listed options, that option is highlighted by default. In response to receiving a user selection from the first party of one of the options and/or in response to the first party selecting a send option, the prosecution data entry module 230 retrieves the document corresponding to the selected prosecution activity (e.g., directly from the PAIR system and/or from the local patent management server 114 in the first jurisdiction). The prosecution data entry module 230 obtains contact information for a second party in a second jurisdiction or country and generates a communication to notify the second party about the selected prosecution activity. The prosecution data entry module 230 may populate a template with the metadata corresponding to the selected option from the list of options, a patent application number of the file wrapper, other bibliographical information about the patent application, a title of the prosecution activity, due dates associated with the prosecution activity, and the retrieved document. The prosecution data entry module 230 transmits the populated template to the local patent management server 114 of the second party.

Figure 3:
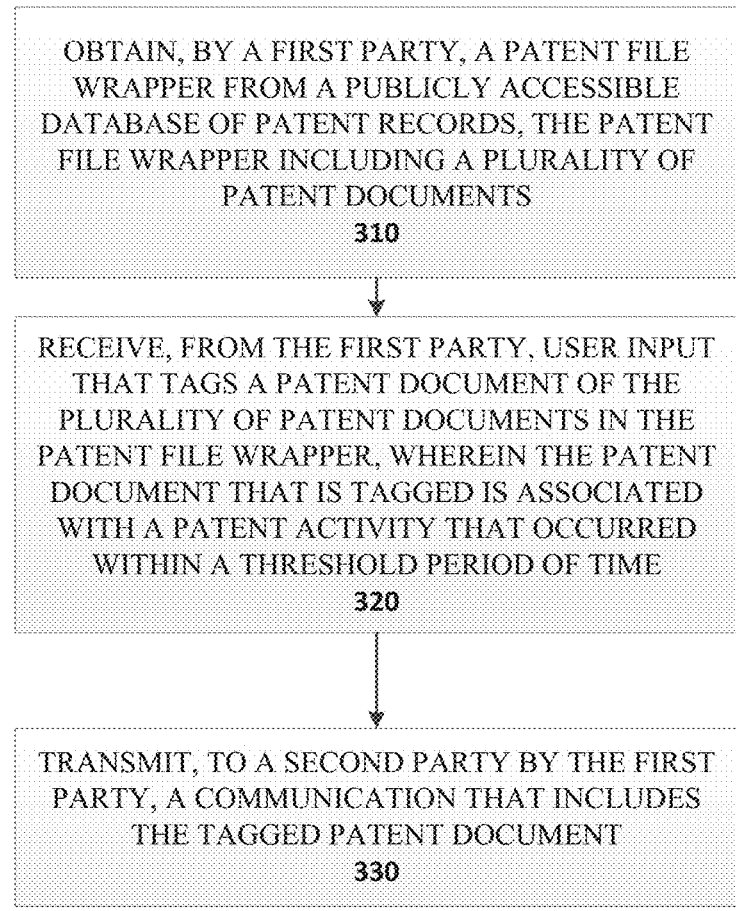
FIG. 3 is a block diagram showing processes for tagging prosecution activities, according to example embodiments.

FIG. 3 is a block diagram showing a process 301 for receiving prosecution activities, according to example embodiments. The operations discussed below in connection with FIG. 3 may be performed in any order or may be omitted entirely. The operations of FIG. 3 may be a set of non-transitory or transitory computer-readable instructions that prosecution data entry module 230 may execute to selectively transmit prosecution activity information from one jurisdiction or country to another according to a predefined structure.

At operation 310, the prosecution data entry module 230 obtains, by a first party, a patent file wrapper from a publicly accessible database of patent records, the patent file wrapper including a plurality of patent documents. For example, the prosecution data entry module 230 may access a PAIR system in a first jurisdiction or country directly by inputting a given application identifier (e.g., patent application number) of a particular matter. The PAIR system may return to the prosecution data entry module 230 a list of patent prosecution activities. Alternatively, the prosecution data entry module 230 may access a local copy of the PAIR system information that has been previously downloaded and stored in the local patent management server 114 associated with the first party in the first jurisdiction.

FIGS. 4 and 5 illustrate presentation of prosecution activities retrieved from a local copy of the PAIR system in the local patent management server 114 according to some embodiments. Specifically, FIG. 4 shows a number of bibliographical fields 400 of docketing information for a matter 401 (e.g., matter title, file number, country, status, date filed, grant date, application number, etc.). Any one of the fields shown in FIG. 4 are interactively selectable to search and/or review or correct docketing information stored in the local patent management server 114 for the matter. The docketing information shows a local matter identifier field 402, a status field 404, and a corresponding patent number 406, The user can select any one of the presented fields 400 to display a prosecution activities list (FIG. 5) for the matter 401.

FIG. 5 shows a graphical user interface screen 500 with a number of prosecution activities 510 for the matter 401 (e.g., original letter patent, issue date, issue notification received, issue fee due date, etc.). The activities 510 may be previously downloaded, automatically or in response to user input, from the PAIR system in the first jurisdiction or first country. Alternatively, when the prosecution activities 510 are presented to the user in FIG. 5, a refresh option (not shown) may be selected by the user to access the local PAIR system and update the list of prosecution activities 510. The user can select any of the listed prosecution activities 510 to view documents associated with the listed prosecution activity and/or upload a new document for the listed prosecution activity. The user can also manually add a new prosecution activity to the list of prosecution activities 510.

Figure 6:
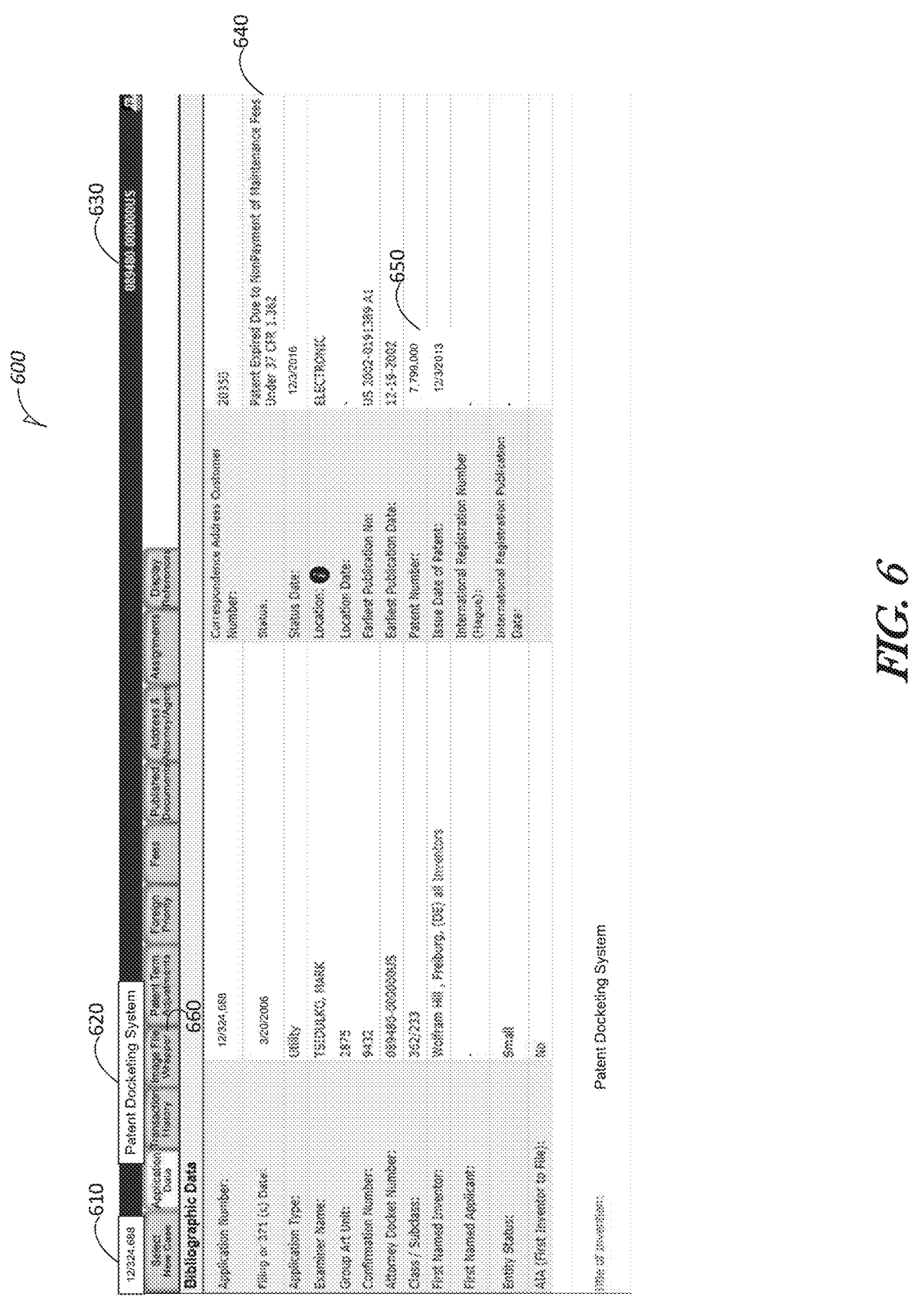
Figure 7:
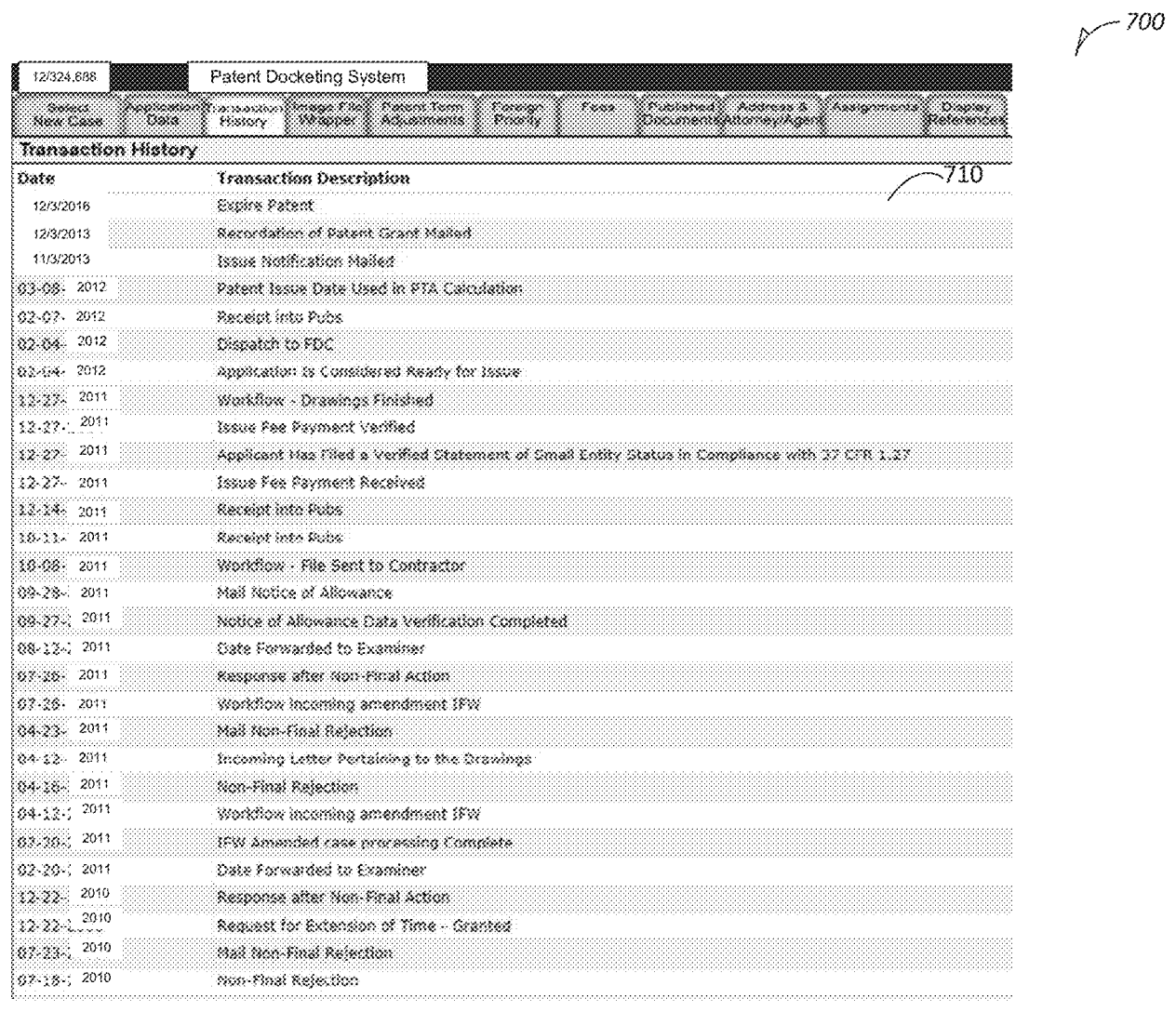

FIGS. 6 and 7 illustrate presentation of prosecution activities retrieved and displayed directly from the PAIR system in the first jurisdiction or first country according to some embodiments. Specifically, FIG. 6 shows a number of bibliographical fields 600 of patent application information for a matter (e.g., matter title, file number, country, status, date filed, grant date, application number, etc.). The bibliographical fields 600 include a title 620 of the patent application, a patent application number 610 of the patent application, a docket number 630, a status 640, and a patent number 650, among others. The user can select an image file wrapper option 660 to display a prosecution activities list (FIG. 6) for the patent application identified in FIG. 5, FIG. 7 shows a graphical user interface screen 700 with a number of prosecution activities 710 for the patent application identified in FIG. 6. The first party in the first jurisdiction or first country can select any one of the listed prosecution activities 710 to report or notify the second party in the second jurisdiction or second country.

Referring back to FIG. 3, at operation 320, the prosecution data entry module 230 receives, from the first party, user input that tags a patent document of the plurality of patent documents in the patent file wrapper, wherein the patent document that is tagged is associated with a patent activity that occurred within a threshold period of time. For example, in response to the prosecution data entry module 230 receiving a user selection of one of the activities 510 or 710 (FIGS. 5 and 7), the prosecution data entry module 230 presents a graphical user interface shown in FIGS. 8A and 8B.

Figure 8A:
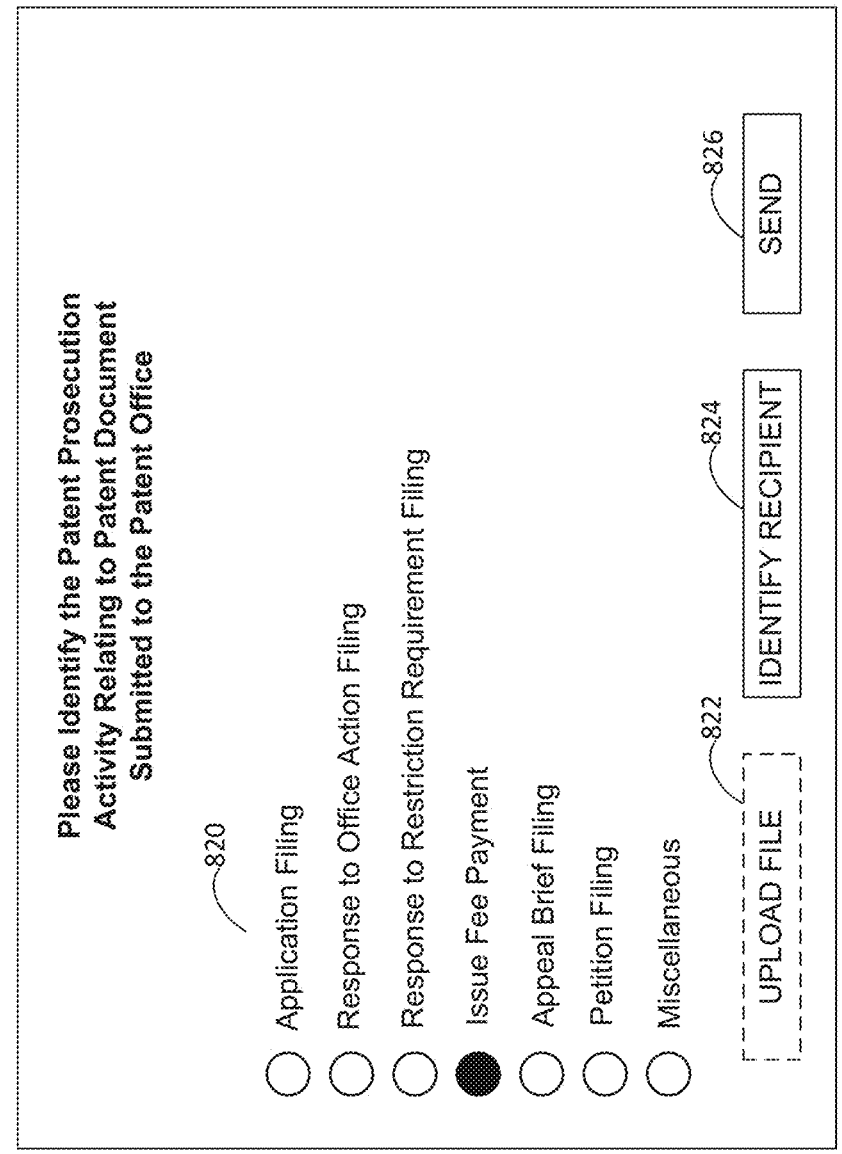

As an example, the prosecution data entry module 230 may determine whether the selected prosecution activity pertains to an action performed by the first party and/or an action of transmitting a document to the local PAIR system. In response to determining that the selected prosecution activity pertains to an action performed by the first party and/or an action of transmitting a document to the local PAIR system, the prosecution data entry module 230 presents, as shown in FIG. 8A, a graphical user interface 810 with a list of options 820 that are identified activities performed in connection with transmitting a document to the PAIR system. Such activities include application filing, response to office action filing, response to restriction requirement filing, issue fee payment, appeal brief filing, petition filing, and miscellaneous.

As an example, the prosecution data entry module 230 may determine whether the selected prosecution activity pertains to an action in which a document was issued or received by the first party from the local PAIR system. In response to determining that the selected prosecution activity pertains to an action in which a document was issued or received by the first party from the local PAIR, system, the prosecution data entry module 230 presents a graphical user interface 812 (FIG. 8B) with a list of options 830 that are identified activities performed in connection with receiving a document issued by the PAIR system. Such activities include restriction requirement received, office action received, notice of allowance received, missing application papers received, and filing receipt received.

The prosecution data entry module 230 receives a user selection of one of the options listed in graphical user interface 810 or 812 that identifies the prosecution activity selected from the activities 510 or 710 (FIGS. 5 and 7). In some embodiments, the prosecution data entry module 230 retrieves, generates and presents a snippet or preview in the graphical user interface 810 or 812 together with the listed options. The snippet or preview may be a low resolution or small image generated by retrieving the document corresponding to the prosecution activity selected from the activities 510 or 710 (FIGS. 5 and 7). This simplifies the user's selection of the options listed in the graphical user interface 810 or 812. In some embodiments, the prosecution data entry module 230 stores categorized and identified documents in a linked file structure so that future documents can be identified by leveraging previously identified documents. For example, the prosecution data entry module 230 can access the file structure to retrieve the immediately previous document (or a set of previous documents) that was categorized and identified by the user. The prosecution data entry module 230 can generate a snippet or preview of the previous document that was categorized and identified to help the user select activities 510 or 710 that represent a new document. In some cases, the snippet or preview of the previous document and the snippet or preview of the new document can be presented simultaneously (side-by-side) to help the user understand and select the correct activities 510 or 710 for the new document.

In some embodiments, the prosecution data entry module 230 may receive a notification from the patent management system 102 in the first jurisdiction that a new document has been downloaded or received from the PAIR system in the first jurisdiction. In response to receiving the notification, the prosecution data entry module 230 presents the graphical user interface 810 or 812 based on the type of document that has been received with a snippet or preview of the document. Based on the graphical user interface 810 or 812, the first party can select an option that identifies the document and can select the send option 826 to automatically generate a template that includes the document and identifies the document for transmission to the second party in the second jurisdiction. In some embodiments, the recipient of the template may be automatically selected by the prosecution data entry module 230 by accessing a history or log of interactions between the first and second parties. For example, if the first party has previously-sent a template or communication about the given patent application associated with the new document to a second party, the prosecution data entry-module 230 may automatically send the template to the second party by default. In some cases, the prosecution data entry module 230 may confirm with the first party that the second party is the intended recipient of the communication about the new document. The first party may modify the identification of the second party if the default second party that is identified is incorrect. The prosecution data entry module 230 then sends the communication with the template including the new document and identification of the prosecution activity related to the new document to the second party in the second jurisdiction.

Referring back to FIG. 3, at operation 330, the prosecution data entry-module 230 transmits, to a second party by the first party, a communication that includes the tagged patent document. For example, once a given one of the options listed in graphical user interface 810 or 812 is selected by the first party, the prosecution data entry-module 230 automatically transmits a communication to a second party that identifies the selected prosecution activity and corresponding document. This may be performed in response to receiving a user selection of the send option 826 after a user selects one of the options that identify the document or prosecution activity. In some cases, the prosecution data entry module 230 may receive a user selection of the identify recipient option 824 to provide the contact information (e.g., email, URL and/or IP address) of the second party in the second jurisdiction or second country.

In some embodiments, the prosecution data entry module 230 retrieves a template corresponding to the option selected from the graphical user interface 810 or 812. The prosecution data entry module 230 automatically populates the template with the bibliographical information corresponding to the patent application or matter for which the prosecution activity was selected, the document corresponding to the selected prosecution activity, and/or the information identifying the prosecution activity based on the selected option from the graphical user interface 810 or 812. The prosecution data entry module 230 transmits the populated template to the local patent management server 114 in the second jurisdiction of the second party. In some cases, the first party may provide additional documents by selecting the upload file option 822. Such additional documents are also added to the populated template.

The local patent management server 114 in the second jurisdiction of the second party parses the template automatically and automatically updates information for the matter associated with the bibliographical and/or patent application number received in the template based on the selected prosecution activity and retrieved document. For example, the selected prosecution activity is a new patent application filing. In response, the local patent management server 114 adds a new record or updates an existing record that matches the bibliographical information of the new patent application filing with the documents received in the template and/or other information that was missing from the local patent management server 114 that is now included in the template, such as the patent application number.

In some embodiments, the first user terminal 104 in a first jurisdiction or first country accesses a website associated with the second jurisdiction or second country of the local patent management server 114. Via the website, the first party may upload a given file (e.g., a document submitted to the PAIR system and/or received from the PAIR system) by selecting the upload file option 822. In response to uploading the document, the website presents the list of options in graphical user interface 810 or 812 for a user to select to identify the prosecution activity representing the uploaded file. Once the option is selected, a template is populated and used to update a matter stored by the local patent management server 114 in the second jurisdiction.

In some embodiments, after the first party uploads a given file, the server leverages a rules engine or machine learning techniques to perform a machine determination or suggest as to what the document should be. For example, the rules engine or machine learning techniques may recognize certain features of a file (e.g., a header, a name, an identifier, and so forth) and may determine the type of document based on the features. Once the type of document is automatically identified, the server can customize automatically the list of options that are presented in the graphical user interface 810 or 812. In some cases, the server, based on the automatically identified document, automatically highlights one or more options that are presented in the graphical user interface 810 or 812 for the user to confirm represent the correct prosecution activity.

In some cases, the server accesses a PAIR system (or a connected docketing system or a system-maintained history built from the communications/transactions processed to date) to determine the prosecution stage associated with the application represented by the uploaded file. The server can analyze the prosecution history to provide suggestions for the user to select to identify the prosecution activity of the uploaded file. In one example, the server presents these suggestions in the form of a most popular documents/actions at this stage type of pre-populated selectable list. In another example, the suggestions can be used to weight identification of a document that is being analyzed to control which options are presented in the user interface 810 or 812. For example, the prosecution history may indicate that the last action or activity was an Office Action that issued. In such cases, the server predicts that the next activity can either be a response, an appeal or an abandonment. Based on this prediction, the server limits the options presented in the graphical user interface 810 or 812 to the predicted activities, Modules, Components and Logic Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS), For example, at least some of the operations may be performed by a group of computers (as examples of machines including processors), with these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations (e.g., from processes 301) may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
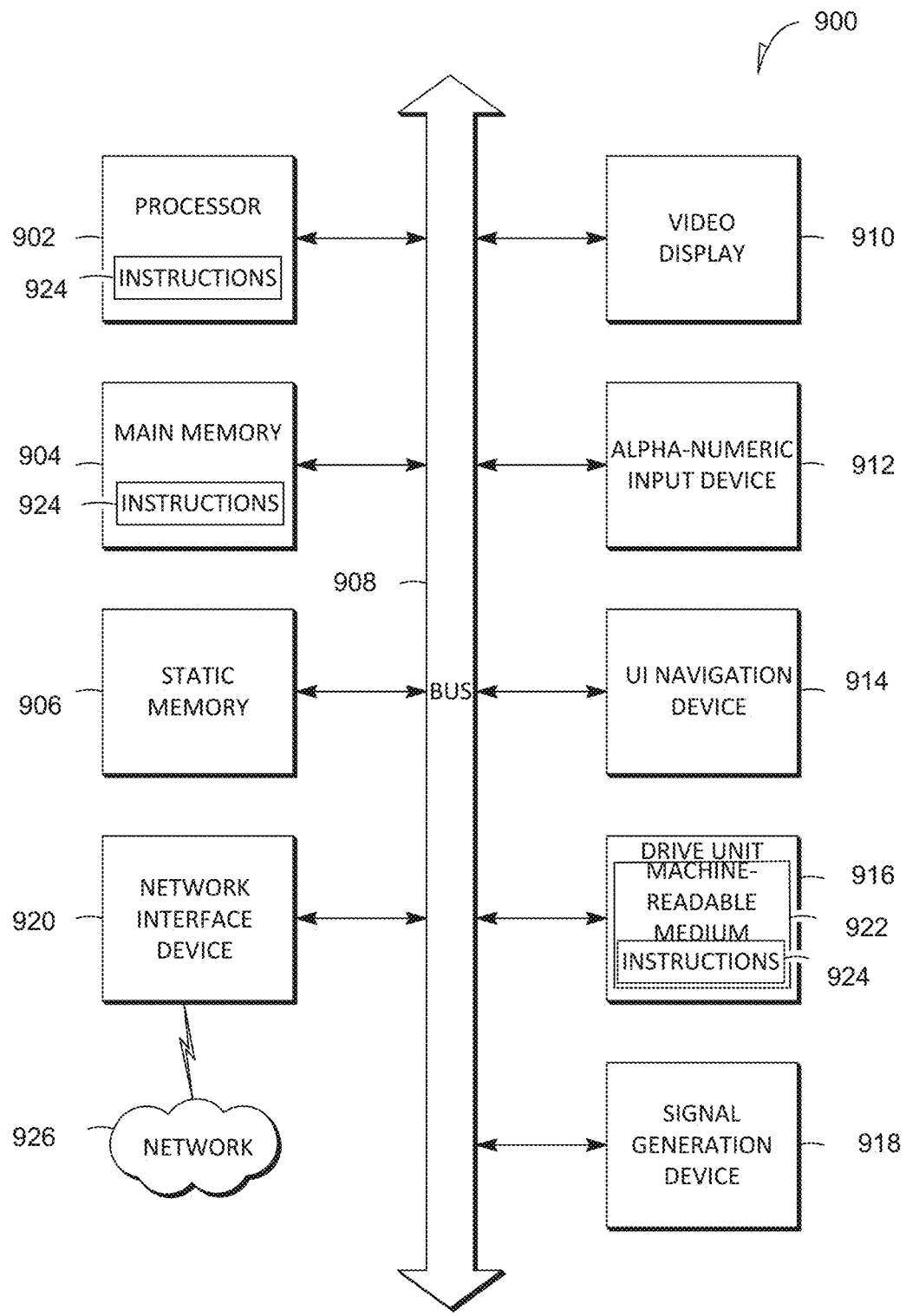
FIG. 9 is a block diagram of machine in the example form of a computer system within which a set of instructions may be executed for causing the machine to perform any one or more of the methodologies herein discussed.

FIG. 9 is a block diagram of a machine in the example form of a computer system 900 within which instructions may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top block (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)), The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The disk drive unit 916 includes a non-transitory machine-readable medium 922 on which is stored one or more sets of non-transitory instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present inventive subject matter, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a, transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part, hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

NOTE ON THE ABSTRACT

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for receiving docketing data, the method comprising: obtaining, by a first party, a patent file wrapper from a publicly accessible database of patent records, the patent file wrapper including a plurality of patent documents,
   receiving, from the first party, user input that tags a patent document of the plurality of patent documents in the patent file wrapper, wherein the patent document that is tagged is associated with a patent activity that occurred within a threshold period of time; and transmitting, to a second party by the first party, a communication that includes the tagged patent document,
   wherein transmitting the communication comprises: accessing, by the first party, a graphical user interface on a website; uploading the patent document via the website, and
   selecting an option that identifies the patent document from a predetermined list of options, the uploaded patent document being input to a patent database of the second party.

2. The method of claim 1, wherein obtaining the patent file wrapper comprises: accessing, by the first party, the publicly accessible database of patent records;
inputting an identifier of the patent file wrapper; and downloading a copy of the patent file wrapper from the publicly accessible database.

3. The method of claim 1, wherein the first party' is an agent in a first country', wherein the publicly accessible database maintains patent records for a first country, and wherein the second party is an agent in a second country.

4. The method of claim 1, wherein the patent file wrapper is obtained in response to receiving a user request to update a local patent database of docketing information.

5. The method of claim 1, wherein the patent file wrapper is obtained automatically periodically and is used to update a local patent database of docketing information.

6. The method of claim 1, wherein receiving the user input comprises: selecting, as the patent document, among the plurality of patent documents a recently filed patent document;
presenting, on a graphical user interface to the first party, a plurality of patent prosecution activity options, each of the plurality of patent prosecution activity options identifying a different type of patent prosecution activity; and receiving a selection from the first party of a patent prosecution activity option from the plurality of patent prosecution activity options.

7. The method of claim 6, wherein the plurality of patent prosecution activity options includes a miscellaneous option, and wherein the patent prosecution activities describe actions related to submitting documents to the publicly accessible database.

8. The method of claim 6, wherein the communication that includes the tagged patent document is automatically transmitted in response to receiving the selection of the patent prosecution activity option.

9. The method of claim 1, wherein obtaining the patent file wrapper comprises: receiving, by the first party, a notification that a new patent document is available for the patent file wrapper in the publicly accessible database; presenting, on a graphical user interface to the first party, a plurality of patent prosecution activity options, each of the plurality of patent prosecution activity options identifying a different type of patent prosecution activity; and receiving a selection from the first party of a patent prosecution activity option from the plurality of patent prosecution activity options.

10. The method of claim 9, wherein the patent prosecution activities describe actions related to responding to the new7 patent document.

11. The method of claim 9, wherein the communication that includes the tagged patent document is automatically transmitted in response to receiving the selection of the patent prosecution activity option.

12. The method of claim 1, wherein transmitting the communication comprises sending an email that contains the tagged patent document as an attachment.

13. The method of claim 1, further comprising:
updating a patent database, maintained by a server associated with the first party, with the patent file wrapper obtained from the publicly accessible database of patent records; and
accessing the patent database by the first party to provide the user input, that tags the patent document.

14. The method of claim 13, wherein the patent database is updated periodically or in response to receiving a user request by accessing the publicly accessible database of patent records.

15. The method of claim 1, further comprising automatically categorizing or coding the tagged patent document in a patent database maintained by the second party.

16. A patent management, system comprising:
at least one patent database, accessible via a network, and storing data including docketing information for at least one matter stored in the database, and a server, operatively connected to the network, wherein the server includes: a processor; a memory; and
the processor is configured to perform operations comprising:
obtaining, by a first party, a patent file wrapper from a publicly accessible database of patent records, the patent file wrapper including a plurality of patent documents;
receiving, from the first party, user input that tags a patent document of the plurality of patent documents in the patent file wrapper, wherein the patent document that is tagged is associated with a patent activity that occurred within a threshold period of time; and transmitting, to a second party by the first party, a communication that includes the tagged patent document,
wherein transmitting the communication comprises: accessing, by the first party, a graphical user interface on a website; uploading the patent document via the website, and
selecting an option that identifies the patent document from a predetermined list of options, the uploaded patent document being input to a patent database of the second party.

17. The patent management system of claim 16, wherein the first party is an agent in a first country, wherein the publicly accessible database maintains patent records for a first country, and wherein the second party is an agent in a second country.

18. The patent management system of claim 16, wherein the patent file wrapper is obtained in response to receiving a user request to update a local patent database of docketing information.

19. A non-transitory computer-readable medium comprising non-transitory computer-readable instructions for receiving docketing data, the non-transitory computer-readable instructions, when executed by one or more processors, performing operations comprising:
obtaining, by a first party, a patent file wrapper from a publicly accessible database of patent records, the patent file wrapper including a plurality of patent documents; receiving, from the first party, user input that tags a patent document of the plurality of patent documents in the patent file wrapper, wherein the patent document that is tagged is associated with a patent activity that occurred within a threshold period of time; and transmitting, to a second party by the first party, a communication that includes the tagged patent document,
wherein transmitting the communication comprises: accessing, by the first party, a graphical user interface on a website; uploading the patent document via the website, and
selecting an option that identifies the patent document from a predetermined list of options, the uploaded patent document being input to a patent database of the second party.

* * * * *

UNITED STATES PATENT AND TRADEMARK OFFICE
CERTIFICATE OF CORRECTION

PATENT NO. : 11,132,412 B1
APPLICATION NO. : 16/836178
DATED : September 28, 2021
INVENTOR(S) : Lundberg et al.

It is certified that error appears in the above-identified patent and that said Letters Patent is hereby corrected as shown below:

On the Title Page

Item (22), in "Filed", in Column 1, Line 1, after "2020", insert a linebreak and
--(65) Prior Publication Data
US 2021/0303643 A1 Sep. 30, 2021--

Item (57), in "Abstract", in Column 2, Line 5, delete "patent-file" and insert --patent file-- therefor Item (57), in "Abstract", in Column 2, Line 10, delete "time:" and insert --time;-- therefor In the Claims In Column 20, Line 49, in Claim 1, after "comprising:", insert a linebreak In Column 20, Lines 51-52, in Claim 1, delete "documents," and insert --documents;-- therefor In Column 20, Line 57, in Claim 1, after "and", insert a linebreak In Column 20, Line 60, in Claim 1, after "comprises:", insert a linebreak In Column 20, Line 62, in Claim 1, after "website;", insert a linebreak In Column 21, Line 2, in Claim 2, after "comprises:", insert a linebreak In Column 21, Line 4, in Claim 2, after "and", insert a linebreak In Column 21, Line 7, in Claim 3, delete "party'" and insert --party-- therefor In Column 21, Line 8, in Claim 3, delete "country'," and insert --country,-- therefor Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,132,412 B1

In Column 21, Line 19, in Claim 6, after "comprises:", insert a linebreak

In Column 21, Line 26, in Claim 6, after "and", insert a linebreak

In Column 21, Line 40, in Claim 9, after "comprises:", insert a linebreak

In Column 21, Line 42, in Claim 9, after "database;", insert a linebreak

In Column 21, Line 46, in Claim 9, after "and", insert a linebreak

In Column 21, Line 51, in Claim 10, delete "new7" and insert --new-- therefor

In Column 22, Line 8, in Claim 16, delete "management," and insert --management-- therefor In Column 22, Line 12, in Claim 16, after "includes:", insert a linebreak In Column 22, Line 12, in Claim 16, after "processor;", insert a linebreak In Column 22, Line 23, in Claim 16, after "and", insert a linebreak In Column 22, Line 26, in Claim 16, after "comprises", insert a linebreak In Column 22, Line 28, in Claim 16, after "website;", insert a linebreak In Column 22, Line 50, in Claim 19, after "documents;", insert a linebreak In Column 22, Line 55, in Claim 19, after "and", insert a linebreak In Column 22, Line 58, in Claim 19, after "comprises", insert a linebreak In Column 22, Line 60, in Claim 19, after "website;", insert a linebreak